United States Patent
Baumgartner et al.

(10) Patent No.: US 7,080,269 B2
(45) Date of Patent: Jul. 18, 2006

(54) METHOD AND APPARATUS FOR IMPLEMENTING POWER-SAVING SLEEP MODE IN DESIGN WITH MULTIPLE CLOCK DOMAINS

(75) Inventors: Yoanna Baumgartner, Austin, TX (US); Sundeep Chadha, Austin, TX (US); Richard Nicholas Iachetta, Jr., Pflugerville, TX (US); Hien Minh Le, Cedar Park, TX (US); Kirk Edward Morrow, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 10/439,040

(22) Filed: May 15, 2003

(65) Prior Publication Data

US 2004/0230850 A1 Nov. 18, 2004

(51) Int. Cl.
*G06F 1/26* (2006.01)

(52) U.S. Cl. ................. 713/320; 713/300; 713/322

(58) Field of Classification Search ......... 713/320, 713/322, 300
See application file for complete search history.

(56) References Cited

U.S. PATENT DOCUMENTS

| | | | | |
|---|---|---|---|---|
| 5,471,625 A | * | 11/1995 | Mussemann et al. | ....... 713/322 |
| 5,504,910 A | * | 4/1996 | Wisor et al. | ................. 713/322 |
| 5,511,203 A | * | 4/1996 | Wisor et al. | ................. 713/322 |
| 6,021,500 A | * | 2/2000 | Wang et al. | ................. 713/320 |
| 6,021,506 A | * | 2/2000 | Cho et al. | ................... 713/601 |
| 6,738,068 B1 | * | 5/2004 | Cohen et al. | ............... 345/519 |
| 2004/0153676 A1 | * | 8/2004 | Krantz et al. | ............... 713/300 |

* cited by examiner

*Primary Examiner*—Thomas Lee
*Assistant Examiner*—Vincent Tran
(74) *Attorney, Agent, or Firm*—Carr LLP; Diana R. Gerhardt (57) ABSTRACT

A system and a method are provided for implementing a power-saving sleep mode in a synchronous circuit core having multiple clock domains including primary and secondary clock domains. The primary clock domain has states of awake, asleep, doze, and waking. The doze and waking states are transient states between the awake and asleep states. One or more secondary clock domains each have states of secondary awake and secondary asleep. The doze and waking states are used to eliminate race conditions between the primary and secondary clock domains. If the core has two or more secondary clock domains, the secondary clock domains each have an additional state of sleep-pending. The sleep-pending state is a transient state between the secondary awake and secondary asleep states. One or more synchronization logics are coupled between the primary and secondary clock domains.

30 Claims, 4 Drawing Sheets

METHOD AND APPARATUS FOR IMPLEMENTING POWER-SAVING SLEEP MODE IN DESIGN WITH MULTIPLE CLOCK DOMAINS

BACKGROUND OF THE INVENTION

1. Field of the Invention

The invention relates generally to a power-saving technique in a digital circuit and, more particularly, to a power-saving technique in a synchronous digital core design having multiple clock domains.

2. Description of the Related Art

Many modern synchronous circuits or system designs implement a mode called a "sleep mode," which is a power-saving mode that the designs enter when they are essentially idle. Sleep mode is becoming increasingly common in "System On a Chip" (SOC) designs. SOCs are so named because they typically have one or more processors, one or more memory interfaces, and interfaces to various Input/Output (I/O) busses all on the same chip. SOCs are usually created out of "core" designs that are "stitched" together to make the SOC. For example, an SOC may have a plurality of cores such as a processor core, a memory core, an Ethernet core, a PCI core, serial port core, etc. Due to the large amount of functions on the single chip, power conservation is important. Also, because there are many different functions on a single chip, much of the time one or more of the individual core functions will be idle.

When a core is "idle" and is therefore not processing any transactions, many of that core's latches are still consuming power because they are still being clocked. Some of these latches may feed downstream combinational logic causing those combinational gates to switch and also consume power needlessly. The solution has been for the core to go into sleep mode when it has been idle for some programmable amount of time. While a core is in sleep mode, the clocks to all or most of its latches are gated off so that the core consumes almost no power. A core may decide on its own to enter sleep mode, but typically it makes a request to the SOC to go to sleep via a signal called SLEEP_REQ. If the SOC supports sleep mode and that mode is enabled for the particular core, the system will return a SLEEP_ACK signal to the core. The SLEEP_ACK signal (or sometimes a negative active SLEEP_N signal) has traditionally been used by the core to directly gate the clocks inside the core. If the SOC never activates the SLEEP_ACK signal in response to a SLEEP_REQ, then the core will not enter sleep mode. Because there is often a performance penalty for "waking up" from sleep mode, cores typically have programmable counters that make them wait to assert SLEEP_REQ only if they have been idle for some reasonable programmable time.

Once a core is in sleep mode, it will "wake up" when it determines that it is no longer idle. The conditions that cause a core to wake up are specific to each design but they are typically things like a bus transaction whose destination is that core, or an interrupt arriving, etc. When the core detects a wake up event, it will deassert SLEEP_REQ and the SOC will in turn deassert SLEEP_ACK. The clocks will start running again and the core can process the wake up event. While in sleep mode, the core design must take care not to gate the clocks of any part of the design that needs to detect wake-up conditions or any part of the design that must respond to stimulus while the core is in sleep mode. For example, a decode logic cannot typically be gated. Also, the core may have to be able to retry transactions that are destined for it while it is asserting the SLEEP_REQ signal and after it deasserts the SLEEP_REQ signal but before the SLEEP_ACK signal deactivates taking it out of sleep mode.

Cores with single clock domains can switch in and out of sleep mode without difficulty. Implementing sleep mode becomes more complex when a core has multiple clock domains. In this case, the process must be carefully controlled so that going to sleep mode is a process that must complete in all clock domains before the wake-up process can begin. One of the clock domains in a multiple clock domain core is the one that is asserting the SLEEP_REQ to the SOC and is receiving the SLEEP_ACK signal back. This clock domain is called a primary clock domain, whereas the other clock domain(s) are called secondary clock domains. There are several different architectures where implementing sleep mode becomes problematic.

There is a first case where only the primary clock domain receives a wake-up event, i.e., there are no wake-up events that can come from secondary clock domain(s). This first case, for example, includes a one-way I/O core such as a PCI, which takes transactions from a local bus running off of a local clock and runs those transactions on the PCI bus using a PCI clock. In this example, the local bus is in the primary clock domain, whereas the PCI bus is in the secondary clock domain. The primary clock domain decides when to sleep and when to wake up.

The first problem faced is that the SLEEP_ACK signal is a primary clock domain signal and must be synchronized to the secondary domains before being able to be used there. But just synchronizing the SLEEP_ACK signal to the secondary domains and using the synchronized versions to gate the clocks in those domains creates many race conditions and problems. When SLEEP_ACK is deasserted in the primary clock domain, it may still be asserted in one or more secondary clock domains. Thus, the primary clock domain cannot look only at its own SLEEP_ACK to know when it can safely communicate with the secondary clock domains.

At first glance, the simple solution to this problem is to feed the synchronized SLEEP_ACK back from the secondary clock domains (synchronized again) to the primary clock domain so that the primary clock domain can "see" when the secondary clock domains are really awake. So when the primary clock domain sees its own SLEEP_ACK deasserted, it simply waits until all of the other domains also have an inactive SLEEP_ACK. However, there are race conditions that cause this solution not to work. If the SLEEP_REQ is permitted to assert for a brief period of time (e.g., a small number of primary clocks) and then quickly deassert due to a wake-up event, the SLEEP_ACK signal could be asserted for a short period of time.

This is problematic when it is sent to other clock domains. The primary clock domain may see its own SLEEP_ACK assert and then deassert before the synchronized versions of the secondary SLEEP_ACK signals have gotten a chance to ever assert in the primary domain. This way, the primary domain will see those domains as being awake just because the SLEEP_ACK pulse has not gotten through the synchronization logic and back yet. This may cause the primary clock domain to start talking to a secondary clock domain just as it is briefly going to sleep. Some SLEEP_ACK pulses may be so short in the primary clock domain that they do not even show up in a secondary domain. Even if they do show up, their synchronized version back to the primary clock domain may not show up. This fact prevents the primary clock domain from even waiting for the secondary clock domains to assert and then deassert their synchronized version of SLEEP_ACK signals.

Furthermore, there are more difficult and general situations where there are not only multiple clock domains but idle and wake-up events can happen from more than one clock domain. A two clock domain example of this situation could be a PCI bridge that forwards transactions in two directions: (1) from the local bus to PCI and (2) from PCI to the local bus. Each side of the bridge operates on a different clock. When such a bridge core is in a sleep mode, a transaction arriving from either side of the bridge should cause the core to wake up.

Making this scenario work is not straightforward due to the race conditions discussed above as well as other race conditions that arise due to the fact that both sides can now initiate wake-up events. An example of one of these other race conditions is as follows: Assume that the local side is the primary clock domain, which means that SLEEP_REQ is asserted in that domain and that SLEEP_ACK is received in that domain. In this case, the primary clock domain can decide to assert SLEEP_REQ because it believes that the primary and secondary clock domains have both been idle for some time. But any information that the primary clock domain has about the secondary clock domain is delayed due to the synchronization interface. Therefore, the secondary clock domain may actually have gone non-idle due to a transaction arriving around the time that the primary clock domain asserts SLEEP_REQ. This will cause the SLEEP_ACK signal to arrive and put the core to sleep right in the middle of processing a transaction. There are other race conditions involved in waking up. If the secondary clock domain detects a transaction destined for the core, it will wake up and deassert its IDLE signal. That IDLE signal will cross the synchronization logic and eventually cause the core to deassert SLEEP_REQ and SLEEP_ACK will deassert. The secondary clock domain cannot start talking to the primary clock domain as soon as it deasserts its idle signal. Likewise, the primary clock domain cannot start talking to the secondary clock domain as soon as it sees SLEEP_ACK deassert. All of these race conditions occur because different clock domains are making decisions based on information, some of which is current and some of which is not current due to the synchronization delay.

Therefore, a need exists for implementing a power-saving sleep mode in a synchronous design having multiple clock domains without the aforementioned problems including various race conditions.

SUMMARY OF THE INVENTION

The present invention provides a system and a method for implementing a power-saving sleep mode in a synchronous circuit core. The synchronous circuit core includes a sleep controller, a primary clock domain coupled to the sleep controller, one or more secondary clock domains, and one or more synchronization logics coupled between the primary and secondary clock domains. The primary clock domain has a primary-side idle timer and states of awake, asleep, doze, and waking. The doze and waking states are transient states between the awake and asleep states. The one or more secondary clock domains each have a secondary-side idle timer and states of secondary awake and secondary asleep. The doze and waking states are used to eliminate race conditions between the primary and secondary clock domains. If the core has two or more secondary clock domains, the secondary clock domains each have an additional state of sleep-pending. The sleep-pending state is a transient state between the secondary awake and secondary asleep states. The one or more synchronization logics are coupled between the primary and secondary clock domains.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by integrated circuits that are coded to perform such functions, unless indicated otherwise.

Figure 1:
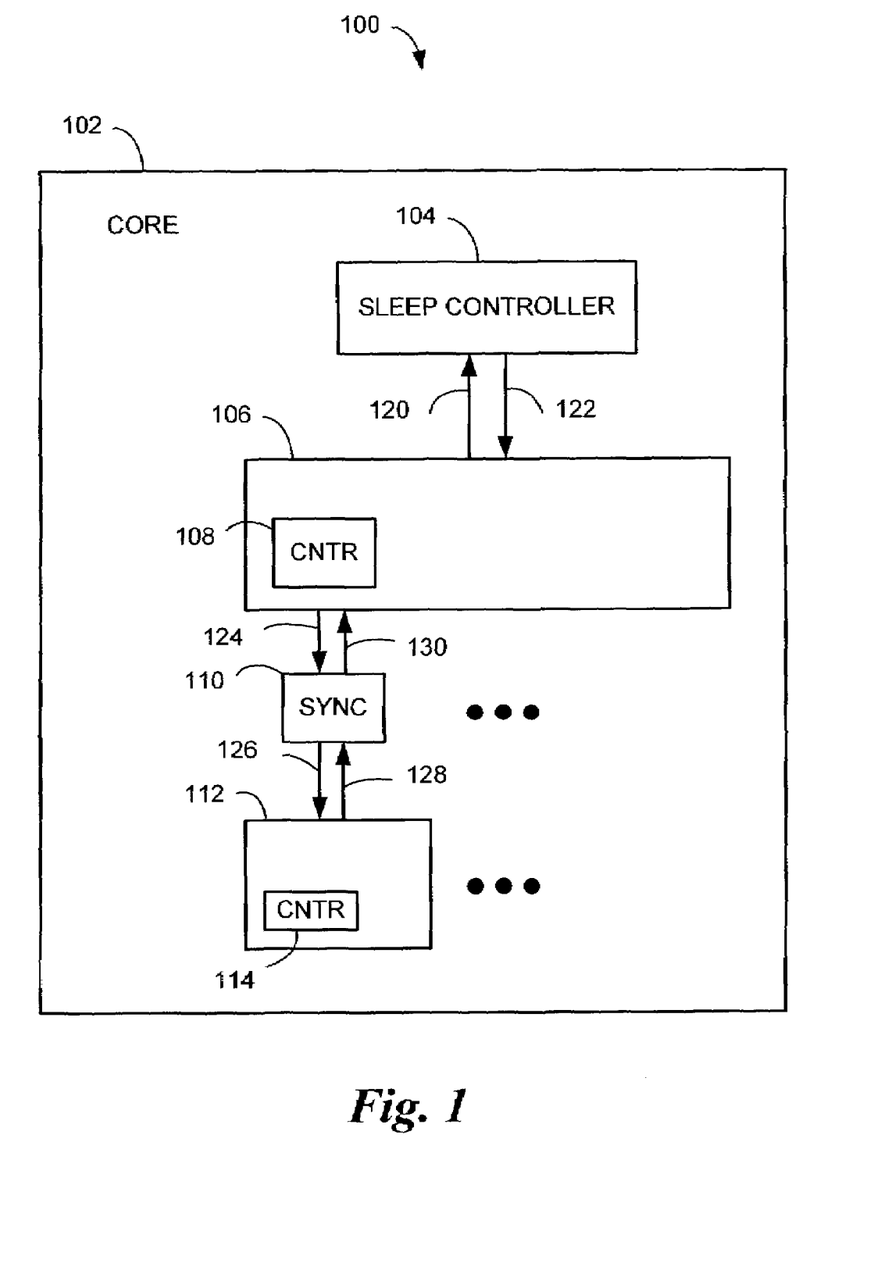
FIG. 1 is a block diagram illustrating a synchronous design core having multiple clock domains.

Referring to FIG. 1 of the drawings, the reference numeral 100 generally designates a synchronous digital system. A core 102 generally represents any one core of many cores in the synchronous digital system. The core 102 comprises a sleep controller 104, a primary clock domain 106 having a primary-side idle timer 108, a synchronization logic (SYNC) 110, and a secondary clock domain 112 having a secondary-side idle timer 114. Note that, for the sake of simplicity, the core 102 shows only one secondary clock domains 112. Note that the core 102 can be any type of synchronous core including a process core, a memory core, a PCI core, etc.

The primary-side idle timer 108 receives signals from both the primary and secondary clock domains 106 and 112 in order to determine whether both the domains 106 and 112 have been idle for a programmable period of time. Preferably, the primary-side and secondary-side idle timers 108 and 114 are implemented with counters. In that case, such counters determine whether both the domains 106 and 112 have been idle for a programmable number of clocks.

The sleep controller 104 is coupled to the primary clock domain 106 for receiving a SLEEP_REQ signal from the primary clock domain 106 and sending a SLEEP_ACK signal via a connection 120 to the primary clock domain 106. The primary clock domain 106 is coupled to the secondary clock domain 112 through the SYNC 110. The primary clock domain 106 and the secondary clock domain 112 contain the primary-side and secondary-side idle timers 108 and 114, respectively. Typically, the secondary-side idle timer 114 is at least an order of magnitude smaller than the primary-side idle timer 108. The primary clock domain 106 receives a SLEEP_ACK signal via a connection 122 from the sleep controller 104 and sends it to the secondary clock domain 112 through the SYNC 110. The primary clock domain 106 sends the SLEEP_ACK signal to the SYNC 110 via a connection 124. The SYNC 110 synchronizes the SLEEP_ACK signal to the secondary clock domain 112. The version of SLEEP_ACK synchronized to the secondary clock domain is called SLEEP_ACK_SEC. The SYNC 110 sends the SLEEP_ACK_SEC signal to the secondary clock domain 112 via a connection 126.

The secondary clock domain 112 sends SEC_AWAKE, SEC_ASLEEP, or SEC_IDLE signal via a connection 128 depending on the situation in which the secondary clock domain 112 is. The SEC_AWAKE signal indicates that the secondary clock domain 112 is in an AWAKE state. The SEC_ASLEEP signal indicates that the secondary clock domain 112 is in an ASLEEP state. The SEC_IDLE signal indicates that the secondary clock domain 112 is idle. The SYNC 110 synchronizes these signals to the primary clock domain and generates SEC_AWAKE_SYNC, SEC_ASLEEP_SYNC, and SEC_IDLE_SYNC signals. Any one of these signals will be transmitted via a connection 130.

The secondary-side idle timer 114 is used to cover the largest possible round trip synchronization delay from the secondary clock domain to the primary clock domain and back. In order words, the secondary-side idle timer 114 ensures that the secondary clock domain 112 has been idle for long enough so that there are not newly arrived transactions into the secondary clock domain that are not being taken into account in the primary clock domain 106 due to the synchronization delay. The relative size of the secondary-side idle timer 114 to that of the primary-side idle timer 108 depends on the relative clock frequencies between the primary and secondary clock domains.

Figure 2:
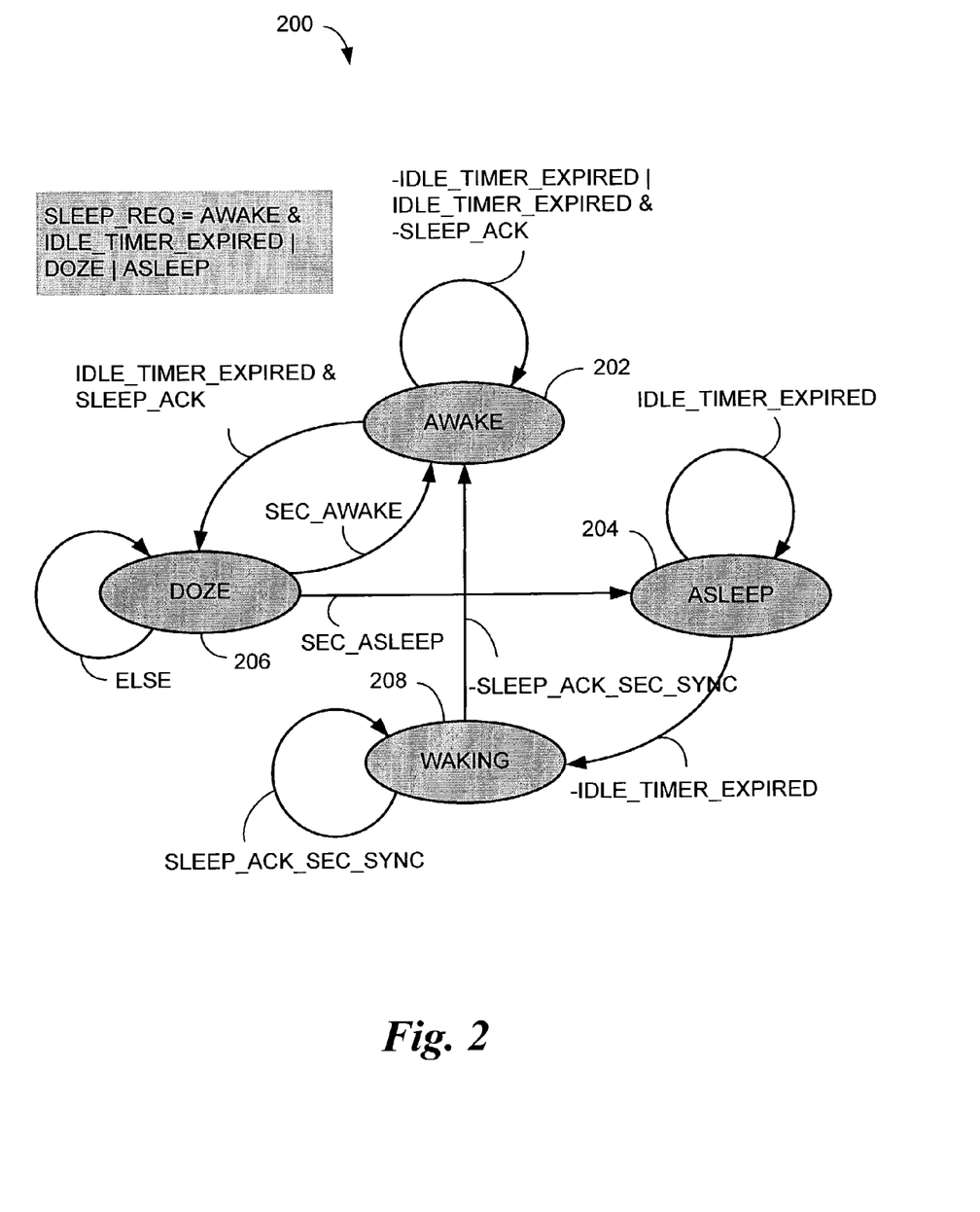
FIG. 2 is a state diagram illustrating the operation of a primary clock domain of FIG. 1.

Now referring to FIG. 2, a state diagram 200 illustrates the operation of a primary clock domain of FIG. 1. Note that the state diagram 200 describes the operation of the primary clock domain interacting with a single secondary clock domain. However, this is compatible with, and applicable to, the general case (as shown in FIG. 1) of the primary clock domain interacting with two or more secondary clock domains in a single core. This is shown below in relation to FIG. 4.

The state diagram 200 generally comprises four states: AWAKE 202, ASLEEP 204, DOZE 206, and WAKING 208. The primary clock domain therefore is put in any one of these four states at a given point in time. The primary clock domain cannot transition from the AWAKE state 202 to the ASLEEP state 204 without going through the DOZE state 206. Likewise, the primary clock domain cannot transition from the ASLEEP state 204 to the AWAKE state 202 without going through the WAKING state 208. In the DOZE state 206, the primary clock domain can transition either to the ASLEEP state 204 or back to the AWAKE state 202.

As shown in FIG. 1, the primary clock domain contains an idle timer for detecting when the core has been idle for the programmable number of clocks. Such an idle timer receives an IDLE signal from both the primary and secondary clock domains. Inevitably, therefore, the IDLE signal from the secondary clock domain is delayed relative to its state in the secondary clock domain. When the primary clock domain determines that the core has been idle for the programmable number of clocks, it asserts a SLEEP_REQ signal. If the core goes non-idle (as seen in the primary clock domain) before the SLEEP_ACK signal has arrived, the core will deassert the SLEEP_REQ signal. If SLEEP_ACK arrives while SLEEP_REQ is deasserted, it will be ignored (i.e., it will deassert shortly). When the SLEEP_ACK signal asserts and the SLEEP_REQ signal is still asserted, the primary clock domain transitions to the DOZE state 206.

In the DOZE state 206, the core may or may not enter a sleep mode (i.e., may or may not transition to the ASLEEP state 204) depending on the answer from the secondary clock domain. While in the DOZE state 206, the primary clock domain will simply hold off any wake-up events via "retries" or "wait states" or any other suitable means. It is vital to keep the primary clock domain idle while waiting to see if the secondary clock domain is still idle. Clocks are enabled (i.e., not gated) in the DOZE state 206. After entering the DOZE state 206, the primary clock domain simply waits for an indication from the secondary clock domain. While in the DOZE state 206, the primary clock domain will not go to the AWAKE state 202 in response to primary clock domain wake-up events. The primary clock domain will not deassert SLEEP_REQ in response to wake up events (i.e., in response to the primary-side idle timer becoming not expired). In other words, while in the DOZE state 206, the primary clock domain stays in the DOZE state 206 until it gets an indication from the secondary clock domain. In short, the primary clock domain has no say at this point, because decision control has been passed to the secondary clock domain in the DOZE state 206. It is the secondary clock domain that decides whether the core should enter sleep mode or not.

The equation for the SLEEP_REQ signal in Verilog™ hardware description language (HDL) is as follows:

SLEEP_REQ =AWAKE &
    IDLE_TIMER_EXPIRED|DOZE|ASLEEP (Verilog™ HDL is a well-known hardware description language used to design and document electronic systems. Verilog™ HDL allows designers to design at various levels of abstraction.) This equation indicates that the primary clock domain asserts the SLEEP_REQ signal when (1) the primary clock domain is in the AWAKE state 202 and the idle timer in the primary clock domain has expired; or (2) the primary clock domain is in the DOZE state 206; or (3) the primary clock domain is in the ASLEEP state 204. Therefore, nothing will cause SLEEP_REQ to deassert while the primary clock domain is in the DOZE state 206 or the ASLEEP state 204.

Figure 3:
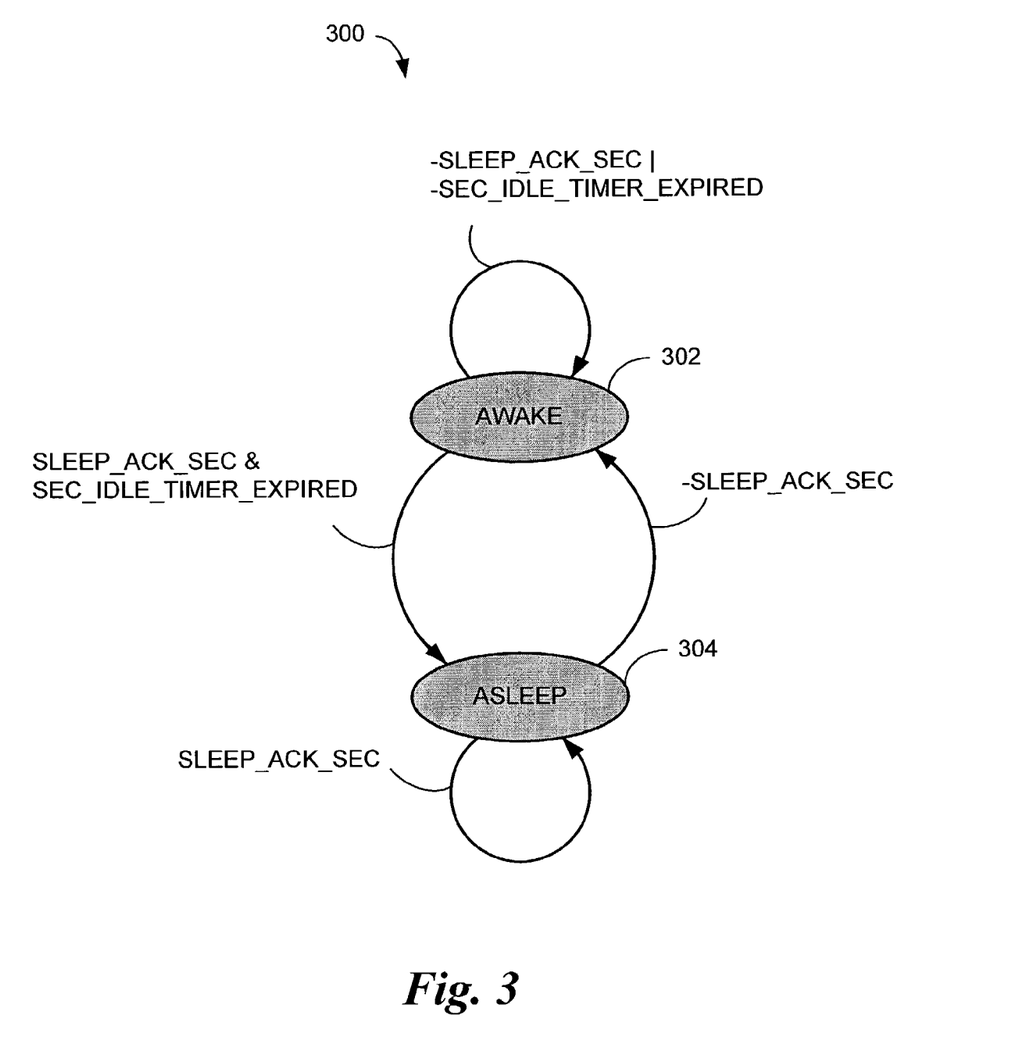
FIG. 3 is a state diagram illustrating the operation of a secondary clock domain of FIG. 1 when there is only one secondary clock domain.

In FIG. 3, a state diagram 300 illustrates the operation of a secondary clock domain of FIG. 1 when there is only one secondary clock domain. The state diagram 300 generally comprises two states: AWAKE 302 and ASLEEP 304.

As shown in FIG. 1, the secondary clock domain has a small idle timer (e.g., the secondary-side idle timer 114) of its own just to cover the largest possible round trip synchronization delay from the secondary clock domain to the primary clock domain and back. The SLEEP_ACK signal is sent to the secondary clock domain through the synchronization logic (e.g., SYNC 110). When the SLEEP_ACK_SEC signal (i.e., the version of SLEEP_ACK synchronized to the secondary clock domain) arrives asserted in the secondary clock domain, the secondary clock domain either goes to the ASLEEP state 304 or remains in the AWAKE state 302 depending on whether the secondary-side idle timer (e.g., the secondary-side idle timer 114 of FIG. 1) indicates that the secondary clock domain has been idle for the required number of clocks. The secondary-side idle timer ensures that, after the primary clock domain asserted SLEEP_REQ, the secondary clock domain did not go non-idle for a brief period of time (and possibly queued a transaction over to the primary clock domain or initiated a transaction) and then become idle by the time SLEEP_ACK_SEC arrives in the secondary clock domain.

The primary clock domain asserted SLEEP_REQ because it saw that the secondary clock domain has been idle. The secondary clock domain idle timer (e.g., the secondary-side idle timer 114) ensures that the secondary clock domain has been idle continuously since the primary clock domain received SLEEP_ACK (with SLEEP_REQ asserted) and the secondary clock domain received an active SLEEP_ACK_SEC signal. If the secondary clock domain idle timer is still expired when the SLEEP_ACK signal arrives in the secondary clock domain, the secondary clock domain transitions to the ASLEEP state 304 and sends a pulse indication to the primary clock domain called SEC_ASLEEP. SEC_ASLEEP indicates that the core is going to sleep. (Note that there is a standard synchronization circuit called a mailbox, which guarantees that a single clock pulse sent from one clock domain is received as a single clock pulse in another clock domain regardless of the relative frequencies and phases of the two clocks. The details of this circuit are outside the scope of the present invention, and therefore will not be explained herein.)

The indication that the core is going to sleep causes the primary clock domain to transition from the DOZE state 206 to the ASLEEP state 204 and now both domains are in the ASLEEP state (i.e., both 204 and 304). Clocks are disabled (gated) in the primary clock domain when the primary clock domain is in the ASLEEP state 204. Similarly, clocks are disabled (gated) in the secondary clock domain when the secondary clock domain is in the ASLEEP state 304. Once the primary clock domain is in the ASLEEP state 204, it is certain that the secondary clock domain is also in the ASLEEP state 304. If, on the other hand, when the SLEEP_ACK_SEC signal arrives in the secondary domain, the secondary clock domain idle timer is no longer expired—indicating that a transaction has arrived to the secondary clock domain while the SLEEP_ACK signal was on its way from the primary clock domain—the secondary clock domain will stay in the AWAKE state 304 and send an indication to the primary clock domain called SEC_AWAKE. That indication (i.e., SEC_AWAKE) causes the primary clock domain to transition from the DOZE state 206 to the AWAKE state 202. In that case, the core never enters sleep mode, and no clocks were ever gated.

Once the primary clock domain goes to the AWAKE state 202, it will deassert SLEEP_REQ. The primary-side idle timer will no longer be expired, because the same condition that caused the SEC_AWAKE indication will also reset the primary-side idle timer. The deassertion of SLEEP_REQ will cause SLEEP_ACK to deassert and eventually cause SLEEP_ACK_SEC to deassert. Note that the secondary clock domain idle timer (e.g., the secondary-side idle timer 114 of FIG. 1) cannot be permitted to expire while SLEEP_ACK_SEC is asserted (i.e., it must be held in its maximum value) to prevent the secondary clock domain state machine from transitioning from the AWAKE state 302 to the ASLEEP state 304 after the secondary clock domain has already indicated SEC_AWAKE due to the subsequent expiration of that secondary-side idle timer.

Once the core is asleep, it can be woken up by wake-up events on either clock domain. Waking up, as going to sleep, is also carefully controlled to avoid race conditions and inconsistencies. The secondary clock domain state machine will not exit the ASLEEP state 304 until SLEEP_ACK_SEC is removed. It will forward, however, non-idle indications (due to incoming traffic) up to the primary clock domain as usual so that the primary clock domain can initiate the wake-up sequence. While the secondary clock domain is in the ASLEEP state 304, it retries or otherwise holds off the incoming traffic.

In the first case where wake-up events are initiated by the secondary clock domain by deasserting the secondary clock domain idle indication due to incoming traffic to that domain, the primary clock domain will (after the synchronization delay) see that the secondary clock domain is no longer idle and transition to the WAKING state. In the WAKING state, SLEEP_REQ is deasserted, and clocks on the primary clock domain are re-enabled. Incoming traffic to the primary clock domain is, however, still retried or otherwise held off because it is not certain that traffic can be handled by the secondary clock domain. SLEEP_ACK will immediately or eventually deassert in response to the deassertion of SLEEP_REQ. The deassertion of SLEEP_ACK will eventually be seen by the secondary clock domain as the deassertion of SLEEP_ACK_SEC. When the secondary clock domain sees SLEEP_ACK_SEC deassert, it transitions from the ASLEEP state 304 to the AWAKE state 302, thereby enabling the clocks of the secondary clock domain. The secondary clock domain can now process incoming transactions. The secondary clock domain knows that the primary clock domain can handle the transactions because the primary clock domain is in the WAKING 208 or AWAKE 202 state when SLEEP_ACK_SEC is deasserted so its clocks are enabled.

The primary clock domain waits for a signal called SLEEP_ACK_SEC_SYNC to deassert before it exits from the WAKING state 208 to the AWAKE state 202. SLEEP_ACK_SEC_SYNC is the SLEEP_ACK_SEC signal synchronized to the primary clock domain. This handshake prevents the primary clock domain from sending traffic to the secondary clock domain before it is certain that the clocks are enabled there. This mechanism does not have short pulse race conditions seen in prior art configurations, because the primary clock domain will never be looking for SLEEP_ACK_SEC_SYNC to be deasserted except in cases where it is already asserted.

In the second case where the wake-up events occur in the primary clock domain, the primary clock domain transitions to the WAKING state 208. This deasserts SLEEP_REQ, and the deassertion of SLEEP_REQ causes the deassertion of SLEEP_ACK. Eventually, SLEEP_ACK_SEC deasserts and takes the secondary clock domain to the AWAKE state 302 and then eventually SLEEP_ACK_SEC_SYNC deasserts in the primary clock domain. The deassertion of SLEEP_ACK_SEC_SYNC causes the primary clock domain to transition to the AWAKE state 202.

In a special implementation of this second case, the secondary clock domain is basically a slave to the primary clock domain and thus does not initiate wake-up events. In this case, the primary clock domain goes to the DOZE state 206 when it has asserted SLEEP_REQ and simply waits for the SLEEP_ACK_SEC_SYNC to arrive asserted in the primary clock domain before going to the ASLEEP state 204. This prevents the short pulses on the SLEEP_ACK and SLEEP_ACK_SEC signals that cause race conditions. There is no need for the SEC_ASLEEP and the SEC_AWAKE indications. Then when the primary clock signal detects a wake-up event, it goes to the WAKING state until the SLEEP_ACK_SEC_SYNC deasserts. Accordingly, going to sleep and waking up is staged and controlled so no race conditions occur.

Figure 4:
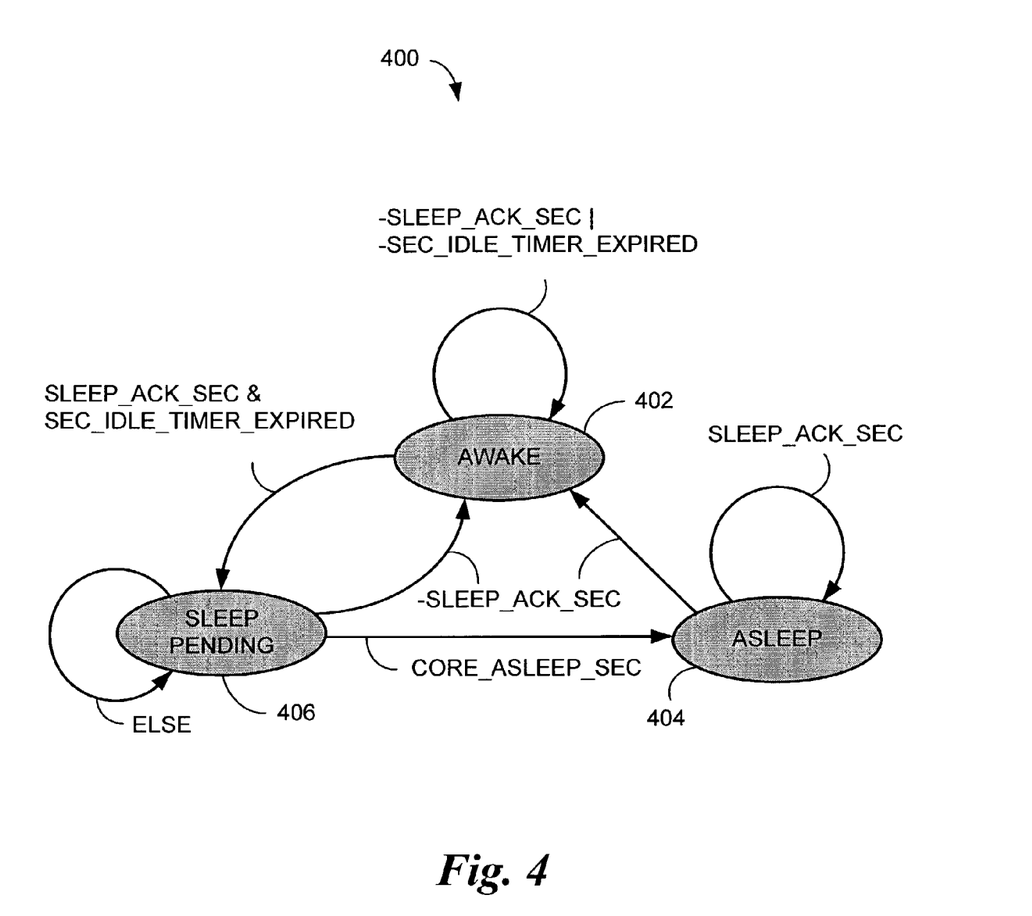
FIG. 4 is a state diagram illustrating the operation of a secondary clock domain of FIG. 1 when there are two or more secondary clock domains.

In FIG. 4, a state diagram 400 illustrates the operation of a secondary clock domain of FIG. 1 when there are two or more secondary clock domains. The state diagram 400 generally comprises three states: AWAKE 402, ASLEEP 404, and SLEEP_PENDING 406. As mentioned above, the state diagram 400 illustrates the very general case where there are multiple secondary clock domains, some or all of which can initiate wake-up events.

Upon detecting that the core has been idle for some time, the primary clock domain asserts SLEEP_REQ and goes to the DOZE state 206 when the SLEEP_ACK signal arrives as before. But now, the core cannot enter the sleep mode until all of the secondary domains indicate that they can go to sleep. The secondary clock domain state machine needs the additional state SLEEP_PENDING 406. Secondary clock domain n goes to the SLEEP_PENDING state 406 when the SLEEP_ACK_SEC[n] signal asserts and the secondary idle timer in that secondary clock domain has expired, where n indicates the number of the secondary domain. Upon the arrival of the SLEEP_ACK_SEC[n] signal, it is requested of each secondary clock domain that, since the core has requested to go to the sleep mode, each secondary clock domain sends the SEC_ASLEEP[n] signal, if its secondary-side idle timer has expired. SEC_ASLEEP[n] indicates that the corresponding secondary clock domain is in the SLEEP_PENDING state 406 and is able to go to the ASLEEP state 404 (not that it has gone to the ASLEEP state already). Additionally, upon arrival of the SLEEP_ACK_SEC[n], it is requested that, if its secondary-side idle timer has not expired, each secondary clock domain send the SEC_AWAKE[n] signal and remain in the SLEEP_AWAKE state 402 until the SLEEP_ACK_SEC[n] signal deasserts. The secondary clock domain N idle timer must be disabled from expiring when SLEEP_ACK_SEC[n] is active to prevent a later transition to the SLEEP_PENDING state 406 after the SEC_AWAKE[n] indication has been given.

Clocks are enabled in the SLEEP_PENDING state 406. If a secondary clock domain sent the SEC_ASLEEP[n] indication, it must retry or otherwise block incoming traffic while in the SLEEP_PENDING state 406 so that it will be guaranteed to still be idle if the primary clock decides to put the core to sleep. If a secondary clock domain sent the SEC_AWAKE[n] indication, then it has begun processing something already so it remains in the AWAKE state and just continues to process the traffic. There is no concern that the core will be put to sleep in the middle of processing this traffic, because the primary clock domain will see the SEC_AWAKE[n] signal and will cancel the sleep sequence, which has not yet gated any clocks. The primary clock domain gathers all of the responses (i.e., votes) from all of the secondary clock domains that can initiate wake-up events via their IDLE signals. If all of them have sent the SEC_ASLEEP indication, then the primary clock domain transitions to the ASLEEP state 204 and sends a broadcast CORE_ASLEEP indication back to the secondary domains. When they receive that signal synchronized to their respective domains (CORE_ASLEEP_SEC[n]), they transition from the SLEEP_PENDING state 406 to the ASLEEP state 404.

If, however, one or more of the secondary clock domains sent the SEC_AWAKE signal (meaning that their respective secondary clock domain idle timer is no longer expired), then the primary clock domain enters the WAKING state 208 and deasserts the SLEEP_REQ. This will cause the SLEEP_ACK to deassert. When the SLEEP_ACK_SEC[n] signal deasserts to each secondary clock domain, those domains that are in the SLEEP_PENDING state 406 will transition from the SLEEP_PENDING 406 to the AWAKE state 402. When the primary clock domain sees that all of the SLEEP_ACK_SEC_SYNC[n] signals have asserted, it transitions from WAKING 208 to AWAKE 202.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A synchronous circuit core, comprising:
   a sleep controller coupled to receive a sleep request signal and configured to produce a sleep acknowledge signal in response to the sleep request signal;
   a primary clock domain and a secondary clock domain, wherein the primary clock domain is coupled to the sleep controller;
   synchronization logic coupled between the primary and secondary clock domains and configured to synchronize signals between the primary and secondary clock domains;
   wherein the primary clock domain comprises a primary-side idle timer coupled to receive an idle signal from the primary clock domain and another idle signal from the secondary clock domain, and configured to use the idle signals to determine whether the primary and secondary clock domains have been idle for a programmable period of time, and wherein the primary clock domain is configured to produce the sleep request signal in the event the primary and secondary clock domains have been idle for the programmable period of time;
   wherein the primary clock domain is configured to receive the sleep acknowledge signal from the sleep controller, and to provide the sleep acknowledge signal to the secondary clock domain via the synchronization logic;
   wherein the sleep acknowledge signal experiences a synchronization delay time in propagating through the synchronization logic; and
   wherein the secondary clock domain comprises a secondary-side idle timer having a time delay, and wherein the secondary clock domain is configured to produce the idle signal from the secondary clock domain after the secondary clock domain has remained idle for the time delay of the secondary-side idle timer, and wherein the time delay of the secondary-side idle timer is greater than or equal to the synchronization delay time.

2. The synchronous circuit core of claim 1, wherein the sleep controller is configured to produce the sleep acknowledge signal in response to the sleep request signal in the event a sleep mode is enabled for the core.

3. The synchronous circuit core of claim 1, wherein the primary clock domain has an awake state, an asleep state, a doze state, and a waking state, and wherein the primary clock domain transitions from the awake state to the doze state when the primary and secondary clock domains have been idle for the programmable period of time and the primary clock domain receives the sleep acknowledge signal from the sleep controller.

4. The synchronous circuit core of claim 3, wherein the secondary clock domain has a secondary awake state and a secondary asleep state, and wherein the primary clock domain transitions from the doze state to the asleep state when the primary clock domain receives a signal from the secondary clock domain via the synchronization logic indicating that the secondary clock domain is in the secondary asleep state.

5. The synchronous circuit core of claim 3, wherein the primary clock domain transitions from the doze state to the awake state when the primary clock domain receives a signal from the secondary clock domain via the synchronization logic indicating that the secondary clock domain is in the secondary awake state.

6. The synchronous circuit core of claim 3, wherein the primary clock domain transitions from the asleep state to the waking state when the primary-side idle timer is not expired.

7. The synchronous circuit core of claim 3, wherein the primary clock domain transitions from the waking state to the awake state when the sleep controller deasserts the sleep acknowledge signal, the primary clock domain provides the deasserted sleep acknowledge signal to the secondary clock domain via the synchronization logic, and the secondary clock domain provides the deasserted sleep acknowledge signal back to the primary clock domain via the synchronization logic.

8. The synchronous circuit core of claim 1, wherein the primary-side idle timer expires when the primary and secondary clock domains have been idle for at least the programmable period of time.

9. A synchronous circuit core, comprising:
a sleep controller coupled to receive a sleep request signal and configured to produce a sleep acknowledge signal in response to the sleep request signal;
a primary clock domain and a plurality of secondary clock domains, wherein the primary clock domain is coupled to the sleep controller;
a plurality of synchronization logic units each coupled between the primary clock domain and a corresponding one of the secondary clock domains and configured to synchronize signals between the primary clock domain and the corresponding one of the secondary clock domains;
wherein the primary clock domain comprises a primary-side idle timer coupled to receive an idle signal from the primary clock domain and an idle signal from each of the secondary clock domains, and configured to use the idle signals to determine whether the primary and secondary clock domains have been idle for a programmable period of time, and wherein the primary clock domain is configured to produce the sleep request signal in the event the primary and secondary clock domains have been idle for the programmable period of time;
wherein the primary clock domain is configured to receive the sleep acknowledge signal from the sleep controller, and to provide the sleep acknowledge signal to each of the secondary clock domains via the corresponding synchronization logic units; and
wherein each of the secondary clock domains comprises a secondary-side idle timer having a time delay, and wherein each of the secondary clock domains is configured to produce the idle signal from the secondary clock domain after the secondary clock domain has remained idle for the time delay of the secondary-side idle timer, and wherein the time delay of the secondary-side idle timer is greater than or equal to a synchronization delay time experienced by the acknowledge signal while propagating through the corresponding synchronization logic unit.

10. The synchronous circuit core of claim 9, wherein the sleep controller is configured to produce the sleep acknowledge signal in response to the sleep request signal in the event a sleep mode is enabled for the core.

11. The synchronous circuit core of claim 9, wherein the primary clock domain has an awake state, an asleep state, a doze state, and a waking state, and wherein the primary clock domain transitions from the awake state to the doze state when the primary and secondary clock domains have been idle for the programmable period of time and the primary clock domain receives the sleep acknowledge signal from the sleep controller.

12. The synchronous circuit core of claim 11, wherein each of the secondary clock domains has a secondary awake state, a secondary asleep state, and a sleep-pending state, and wherein the primary clock domain transitions from the doze state to the asleep state when the primary clock domain receives a signal from each of the secondary clock domains via the corresponding synchronization logic units indicating that all of the secondary clock domains are able to transition from the sleep-pending state to the secondary asleep state.

13. The synchronous circuit core of claim 11, wherein the primary clock domain transitions from the doze state to the awake state when the primary clock domain receives a signal from each of the secondary clock domains via the corresponding synchronization logic unit indicating that all of the secondary clock domains are in the secondary awake state.

14. The synchronous circuit core of claim 11, wherein the primary clock domain transitions from the asleep state to the waking state when the primary-side idle timer is not expired.

15. The synchronous circuit core of claim 11, wherein the primary clock domain transitions from the waking state to the awake state when the sleep controller deasserts the sleep acknowledge signal, the primary clock domain provides the deasserted sleep acknowledge signal to each of the secondary clock domains via the corresponding synchronization logic units, and each of the secondary clock domains provides the deasserted sleep acknowledge signal back to the primary clock domain via the corresponding synchronization logic units.

16. The synchronous circuit core of claim 9, wherein the primary-side idle timer expires when the primary and all of the secondary clock domains have been idle for at least the programmable period of time.

17. A method for implementing a power-saving sleep mode in a synchronous circuit core having a primary clock domain and one or more secondary clock domains, the method comprising the steps of:
during an awake state of the primary clock domain, determining whether the core has been idle for at least a programmable period of time;
upon a determination that the core has been idle for at least the programmable period of time, determining whether a sleep mode is enabled for the core;
upon a determination that the sleep mode is enabled for the core, the primary clock domain transitioning to a doze state;
during the doze state of the primary clock domain, determining whether all of the one or more secondary clock domains have remained continuously idle for periods of time that are greater than or equal to respective synchronization delays between the primary clock domain and the one or more secondary clock domains;
during the doze state of the primary clock domain, upon a determination that all of the one or more secondary clock domains have remained continuously idle for periods of time that are greater than or equal to the respective synchronization delays between the primary clock domain and the one or more secondary clock domains, the one or more secondary clock domains sending the primary clock domain a signal indicating that all of the one or more secondary clock domains are able to transition from a sleep-pending state to the secondary asleep state; and during the doze state of the primary clock domain, upon receiving the signal indicating that all of the one or more secondary clock domains are able to transition from a sleep-pending state to the secondary asleep state, the primary clock domain transitioning to an asleep state.

18. The method of claim 17, further comprising the steps of:

during the asleep state of the primary clock domain, determining whether the primary and one or more secondary clock domains have remained continuously idle for periods of time that are greater than or equal to the respective synchronization delays between the primary clock domain and the one or more secondary clock domains;

during the asleep state of the primary clock domain, upon a determination that the primary and one or more secondary clock domains have remained continuously idle for periods of time that are greater than or equal to the respective synchronization delays between the primary clock domain and the one or more secondary clock domains, the primary clock domain remaining in the asleep state;

during the asleep state of the primary clock domain, upon a determination that the primary and one or more secondary clock domains have not remained continuously idle for periods of time that are greater than or equal to the respective synchronization delays between the primary clock domain and the one or more secondary clock domains, the primary clock domain transitioning to a waking state;

during the waking state of the primary clock domain, determining whether the core has been idle for at least the programmable period of time; and during the waking state of the primary clock domain, upon a determination that the core has not been idle for at least the programmable period of time, the primary clock domain waiting for a signal from the one or more secondary clock domains indicating that the one or more secondary clock domains have received a signal that the core has not been idle for at least the programmable period of time, and then transitioning to the awake state.

19. The method of claim 17, wherein the programmable period of time is measured by a programmable number of clocks in the primary clock domain.

20. The method of claim 17, wherein the step of determining whether sleep mode is enabled for the core comprises the steps of:

the primary clock domain sending a sleep request signal to a sleep controller; and the sleep controller, in response to the sleep request signal, sending a sleep acknowledge signal to the primary clock domain.

21. The method of claim 17, further comprising the step of, upon a determination that the core has not been idle for at least the programmable period of time, the primary clock domain remaining in an awake state.

22. The method of claim 17, further comprising the step of, upon a determination that the sleep mode is not enabled for the core, the primary clock domain remaining in the awake state.

23. The method of claim 17, further comprising the steps of:

upon a determination that not all of the one or more secondary clock domains have remained continuously idle for periods of time that are greater than or equal to the respective synchronization delays between the primary clock domain and the one or more secondary clock domains, the one or more secondary clock domains sending the primary clock domain a signal indicating that the one or more secondary clock domains remain in the awake state; and upon receiving from the one or more secondary clock domains the signal indicating that the one or more secondary clock domains remain in an awake state, the primary clock domain transitioning from the doze state back to the awake state.

24. A computer program product for implementing a power-saving sleep mode in a synchronous circuit core having a primary clock domain and one or more secondary clock domains, the computer program product having a medium with a computer program embodied thereon, the computer program comprising:

computer program code for during an awake state of the primary clock domain, determining whether the core has been idle for at least a programmable period of time;

computer program code for, upon a determination that the core has been idle for at least the programmable period of time, determining whether a sleep mode is enabled for the core;

computer program code for, upon a determination that sleep mode is enabled for the core, making the primary clock domain transition to a doze state;

computer program code for, during the doze state of the primary clock domain, determining whether all of the one or more secondary clock domains have remained continuously idle for periods of time that are greater than or equal to respective synchronization delays between the primary clock domain and the one or more secondary clock domains;

computer program code for, during the doze state of the primary clock domain, upon a determination that the all of the one or more secondary clock domains have remained continuously idle for periods of time that are greater than or equal to the respective synchronization delays between the primary clock domain and the one or more secondary clock domains, making the one or more secondary clock domains transition to an asleep state and sending the primary clock domain a signal indicating that all of the one or more secondary clock domains are able to transition from a sleep-pending state to the secondary asleep state; and computer program code for, during the doze state of the primary clock domain, upon receiving the signal indicating that all of the one or more secondary clock domains are able to transition from a sleep-pending state to the secondary asleep state, making the primary clock domain transition to an asleep state.

25. The computer program product of claim 24, the computer program further comprising:

computer program code for, during the asleep state of the primary clock domain, determining whether the primary and one or more secondary clock domains have remained continuously idle for periods of time that are greater than or equal to the respective synchronization delays between the primary clock domain and the one or more secondary clock domains;

computer program code for, during the asleep state of the primary clock domain, upon a determination that the primary and one or more secondary clock domains have remained continuously idle for periods of time that are greater than or equal to the respective synchronization delays between the primary clock domain and the one or more secondary clock domains, making the primary clock domain remain in the asleep state;

computer program code for, during the asleep state of the primary clock domain, upon a determination that the primary and one or more secondary clock domains have not remained continuously idle for periods of time that are greater than or equal to the respective synchronization delays between the primary clock domain and the one or more secondary clock domains, making the primary clock domain transition to a waking state;

computer program code for, during the waking state of the primary clock domain, determining whether the core has been idle for at least the programmable period of time; and computer program code for, during the waking state of the primary clock domain, upon a determination that the core has not been idle for at least the programmable period of time, making the primary clock domain wait for a signal from the one or more secondary clock domains indicating that the one or more secondary clock domains have received a signal that the core has not been idle for at least the programmable period of time and then making the primary clock domain transition to the awake state.

26. The computer program product of claim 24, wherein the programmable period of time is measured by a programmable number of clocks in the primary clock domain.

27. The computer program product of claim 24, wherein the computer program code for determining whether sleep mode is enabled for the core comprises:

computer program code for making the primary clock domain send a sleep request signal to a sleep controller; and computer program code for making the sleep controller, in response to the sleep request signal, send a sleep acknowledge signal to the primary clock domain.

28. The computer program product of claim 24, further comprising the computer program code for, upon a determination that the core has not been idle for at least the programmable period of time, making the core remain in an awake state.

29. The computer program product of claim 24, further comprising the computer program code for, upon a determination that the sleep mode is not enabled for the core, making the primary clock domain remain in the awake state.

30. The computer program product of claim 24, further comprising:

computer program code for, upon a determination that not all of the one or more secondary clock domains have remained continuously idle for periods of time that are greater than or equal to the respective synchronization delays between the primary clock domain and the one or more secondary clock domains, making the one or more secondary clock domains send the primary clock domain a signal indicating that the one or more secondary clock domains remain in the awake state; and computer program code for, upon the primary clock domain receiving from the one or more secondary clock domains the signal indicating that the one or more secondary clock domains remain in the awake state, making the primary clock domain transition from the doze state back to an awake state.

* * * * *